(12) United States Patent
Podladchikov et al.

(10) Patent No.: US 7,676,326 B2
(45) Date of Patent: Mar. 9, 2010

(54) VH RESERVOIR MAPPING

(75) Inventors: Yuri Podladchikov, Osio (NO);
Marc-André Lambert, Zürich (CH);
Rodolphe Dewarrat, Zürich (CH);
Stefan Schmalholz, Zürich (CH)

(73) Assignee: Spectraseis AG, Zurich (CH)

( * ) Notice: Subject to any disclaimer, the term of this patent is extended or adjusted under 35 U.S.C. 154(b) by 1 day.

(21) Appl. No.: 11/757,362

(22) Filed: Jun. 2, 2007

(65) Prior Publication Data

US 2008/0002523 A1    Jan. 3, 2008

Related U.S. Application Data

(60) Provisional application No. 60/804,420, filed on Jun. 9, 2006, provisional application No. 60/806,455, filed on Jun. 30, 2006.

(51) Int. Cl.
*G01V 1/30* (2006.01)
*G01V 1/28* (2006.01)
*G06F 19/00* (2006.01)
*G06F 17/40* (2006.01)

(52) U.S. Cl. .................. 702/11; 73/152.01; 73/152.02; 73/570; 73/584; 73/592; 166/244.1; 166/250.01; 166/254.1; 175/40; 175/50; 367/14; 367/68; 367/69; 367/87; 702/1; 702/2; 702/6; 702/127; 702/187; 702/189

(58) Field of Classification Search .............. 73/152.02, 73/152.05, 152.01, 570, 584, 592; 181/101, 181/108, 113, 122; 367/14, 118, 13, 15, 367/25, 37, 38, 68, 69, 93, 99; 702/13, 14, 702/15, 17, 18, 1, 2, 16, 127, 187, 189; 166/244.1, 166/250.01, 250.16, 254.1; 175/40, 41, 50; 324/76.11, 323, 324
See application file for complete search history.

(56) References Cited

U.S. PATENT DOCUMENTS

| 4,312,049 A | 1/1982 | Masse et al. |
| 4,554,648 A | 11/1985 | Greer et al. |
| 4,887,244 A | 12/1989 | Willis et al. |
| 5,111,399 A | 5/1992 | Armitage |

(Continued)

FOREIGN PATENT DOCUMENTS

DE    102004028034 A1    12/2005

(Continued)

OTHER PUBLICATIONS

Macedo et al. "Direct Hydrocarbon Detection Experiment in Potiguar Basin"; 9TH International Congress, Brazillian Geophysical Society, Sep. 11-14, 2005.*

(Continued)

*Primary Examiner*—Edward R Cosimano (57) ABSTRACT

A method and system of detecting and mapping a subsurface hydrocarbon reservoir includes determining ratio data for a plurality of orthogonal spectral components of naturally occurring low frequency background seismic data. The ratio data may be compared, plotted, contoured and displayed as a subsurface hydrocarbon reservoir map or a hydrocarbon potential map. The ratio data may represent a vertical spectral component of the seismic data over a horizontal spectral component of the seismic data. The subsurface hydrocarbon reservoir map may include contouring the ratio data over a geographical area associated with the seismic data.

6 Claims, 3 Drawing Sheets

U.S. PATENT DOCUMENTS

| | | |
|---|---|---|
| 5,148,110 A | 9/1992 | Helms |
| 5,153,858 A | 10/1992 | Hildebrand |
| 5,383,114 A | 1/1995 | Chambers |
| 5,414,674 A | 5/1995 | Lichman |
| 5,671,136 A | 9/1997 | Willhoit, Jr. |
| 6,414,492 B1 | 7/2002 | Meyer et al. |
| 6,442,489 B1 | 8/2002 | Gendelman et al. |
| 6,473,695 B1 | 10/2002 | Chutov et al. |
| 6,519,533 B1 | 2/2003 | Jeffryes |
| 6,612,398 B1 | 9/2003 | Tokimatsu et al. |
| 6,654,692 B1 | 11/2003 | Neff |
| 6,829,538 B2 | 12/2004 | de Kok |
| 6,932,185 B2 | 8/2005 | Bary et al. |
| 6,934,219 B2 | 8/2005 | Burkholder et al. |
| 7,243,029 B2 | 7/2007 | Lichman et al. |
| 7,539,578 B2* | 5/2009 | Saenger .................. 702/14 |
| 7,590,491 B2* | 9/2009 | Saenger .................. 702/14 |
| 2002/0110048 A1 | 8/2002 | Vandenbroucke et al. |
| 2003/0067843 A1 | 4/2003 | Therond et al. |
| 2003/0218939 A1 | 11/2003 | Casarsa et al. |
| 2004/0008580 A1 | 1/2004 | Fisher et al. |
| 2004/0017730 A1 | 1/2004 | Jackson et al. |
| 2004/0112595 A1 | 6/2004 | Bostick et al. |
| 2004/0125695 A1 | 7/2004 | Jones et al. |
| 2004/0125696 A1 | 7/2004 | Jones et al. |
| 2005/0060099 A1 | 3/2005 | Sorrells et al. |
| 2005/0098377 A1 | 5/2005 | Bary et al. |
| 2005/0099888 A1 | 5/2005 | Martin et al. |
| 2005/0105392 A1 | 5/2005 | Martin |
| 2005/0173111 A1 | 8/2005 | Bostick, III |
| 2005/0183858 A1 | 8/2005 | Ayoub et al. |
| 2005/0190649 A1 | 9/2005 | Eisner et al. |
| 2005/0276162 A1 | 12/2005 | Brinkmann et al. |
| 2005/0288862 A1 | 12/2005 | Rode et al. |
| 2005/0288863 A1 | 12/2005 | Workman |
| 2006/0009911 A1 | 1/2006 | Burkholder |
| 2006/0023567 A1 | 2/2006 | Uhl |
| 2006/0034153 A1 | 2/2006 | Meunier |
| 2006/0047431 A1 | 3/2006 | Geiser |
| 2006/0062084 A1 | 3/2006 | Drew |
| 2006/0081412 A1 | 4/2006 | Wright et al. |
| 2006/0092765 A1 | 5/2006 | Jones |
| 2006/0219402 A1 | 10/2006 | Lecampion |
| 2006/0227658 A1 | 10/2006 | Toennessen et al. |
| 2006/0285438 A1 | 12/2006 | Arrowsmith et al. |
| 2007/0133354 A1 | 6/2007 | Bagaini et al. |
| 2007/0255500 A1 | 11/2007 | Pita et al. |
| 2008/0021655 A1* | 1/2008 | Saenger .................. 702/13 |
| 2008/0021656 A1* | 1/2008 | Saenger .................. 702/13 |
| 2008/0288173 A1* | 11/2008 | Saenger .................. 702/16 |
| 2009/0187347 A1* | 7/2009 | Saenger .................. 702/16 |

FOREIGN PATENT DOCUMENTS

| | | |
|---|---|---|
| EP | 1166152 B1 | 1/2002 |
| EP | 1166151 B1 | 2/2002 |
| EP | 1605279 A2 | 12/2005 |
| RU | 2045079 C1 | 9/1995 |
| RU | 2054697 C1 | 2/1996 |
| RU | 2091816 C1 | 9/1997 |
| RU | 2119677 C1 | 9/1998 |
| RU | 2145101 C1 | 1/2000 |
| RU | 2145102 C1 | 1/2000 |
| SU | 1831693 A3 | 7/1993 |
| WO | 33107 | 6/2000 |
| WO | 00/60378 | 10/2000 |
| WO | 2006011826 A1 | 2/2006 |

OTHER PUBLICATIONS

Holzner R., et al., "Applying microtremor analysis to identify hydrocarbon reservoirs", first break, pp. 41-46, May 23, 2005.*

Theodulidis et al: "Horizontal-to-Vertical Spectral Ration and Geological Conditions: The case of Garner Valley Downhole Array in Southern California", Bulletin of the Seismological society of America, Apr. 1996, vol. 86, No. 2, pp. 306-319.*

PCT International Search Report and Written Opinion of the International Searching Authority for PCT International Application No. PCT/IB2007/052075.

Ebrom, D.: "The low-frequency gas shadow on seismic sections" The Leading Edge, 2004, p. 772.

Castagna, J.P., et al: "Instantaneous spectral analysis: Detection of low-frequency shadows associated with hydrocarbons" The Leading Edge, 2003, pp. 120-127.

Sinha S., et al: "Spectral decomposition of seismic data with continuous-wavelet transform" Geophysics, v. 70(6), pp. 19-25 (Nov.-Dec. 2005).

Virieux J., "P-SV wave propogation in heterogeneous media: Velocity-stress finite-difference method" Geophysics, v. 51(4) pp. 889-901 (Apr. 1986).

Fah D., Kind F., Giardini D.: A Theoretical Investigation of Average H/V Ratios Geophys. J. Int. V. 145, 2001, pp. 535-549.

Lombardo G., Rigano R.: "Amplification of ground motion in fault and fracture zones" J. of Volcanology and Geothermal Res., V. 153, pp. 167-176, May 15, 2006.

Levashov S. P. et al: "Integrated application of geoelectric methods and low frequency acoustic prospecting . . . " p. 238, Eage 67th Conf. and Exh., Madrid Spain, Jun. 13-16, 2005.

Wilson D. et al: "Broadband seismic noise at temporary seismic stations . . . " BSSA, vol. 92, No. 8, pp. 3335-3341, Dec. 2002.

Bard, P.: "Microtremor measurements: A tool for site estimation?" The Effects of Surface Geology on Seismic Motion, pp. 1251-1279 (1999).

Draganov D., et al: "Retrieval of reflection from seismic background noise measurements" Geophys. Res. Let., vol. 34, L04305, (Feb. 22, 2007).

Singer J., et al: "Spectroscopic identification of tremor phenomena over hydrocarbon reservoirs" H-46, Eage 64th Conf & Exh, May 27-30, 2002.

Silin D., et al: Pressure diffusion waves in porous media (2003) (http://repositories.cdlib.org/lbnl/LBNL-52536_Ext_Abs.

Goloshubin G., et al: "Seismic low-frequency effects from oil-saturated reservoir zones" http://repositories.cdlib.org/lbnl/LBNL-50638 (2002).

Hilpert M., et al: "Capillarity-induced resonance of oil blobs in capillary tubes and porous media" Geophysics, vol. 65 pp. 874-883 (2000).

Dangel S., et al: "Phenomenology of tremor-like signals observed over hydrocarbon reservoirs" Jour. of Volcanology and Geothermal Research, v. 128(1-3): pp. 135-158, 2003.

Korneev V., et al: "Seismic low-frequency effects in monitoring fluid saturated reservoirs" Geophysics, v. 69(2) pp. 522-532 (2004).

Holzner R. et al "Hydrocarbon microtremors interpreted as oscillations driven by oceanic background waves," EAGE 68th Conf & Exh, Vienna, Austria, 2006.

Nakamura Y., 1989, "A method for dynamic characteristics estimation of subsurface using microtremor . . . " Quarterly Report Railway Technical Research Institute, 30, 25-30.

Holzner R., et al., Applying microtremor analysis to identify hydrocarbon reservoirs, first break, pp. 41-46, May 23, 2005.

Rhie J., Romanowicz B., "Excitation of Earth's continuous free oscillations by atmosphere-ocean-seafloor coupling" Nature, v. 431, pp. 552-556, Sep. 30, 2004.

Kedar S., Webb F., "The Ocean's Seismic Hum" Science, v. 307, pp. 682-683, 4-Feb-200.

Eisner, L., et al "Graph theory finds microseismic multiplets" EAGE Conf & Exh, Madrid, Spain Jun. 13-15, 2005.

Stoll E., et al, "Numerical solution of the acoustic wave equation at the limit between near and far field propogation" Int. J. of Mod. Phys. C, v. 12(10), p. 1497-1507 (2001).

Stutzmann E., et al: "Moise: A prototype multiparameter ocean-bottom station" BSSA, v. 91(4), pp. 885-892, Aug. 2001.

PCT International Search Report and Written Opinion of the International Searching Authority for PCT International Application No. PCT/IB2007/052552.

PCT International Search Report and Written Opinion of the International Searching Authority for PCT International Application No. PCT/IB2007/052553.

PCT International Search Report and Written Opinion of the International Searching Authority for PCT International Application No. PCT/IB2007/052075, Dec. 20, 2007.

Silin D., et al: Pressure diffusion waves in porous media (2003) (repositories.cdlib.org/lbnl/LBNL-52536_Ext_Abs.

Kedar S., Webb F., "The Ocean's Seismic Hum" Science, v. 307, pp. 682-683, Feb. 4, 2005.

PCT International Search Report and Written Opinion of the International Searching Authority for PCT International Application No. PCT/IB2007/052552, Jul. 2, 2007.

PCT International Search Report and Written Opinion of the International Searching Authority for PCT International Application No. PCT/IB2007/052553, Dec. 20, 2007.

* cited by examiner

VH RESERVOIR MAPPING

CROSS-REFERENCE TO RELATED APPLICATION

This application claims the benefit of expired U.S. Provisional Application No. 60/804,420 filed 9 Jun. 2006 and expired U.S. Provisional Application No. 60/806,455 filed 30 Jun. 2006.

BACKGROUND OF THE DISCLOSURE

1. Technical Field

The disclosure is related to seismic exploration for oil and gas, and more particularly to processing and displaying seismic data.

2. Description of the Related Art

Seismic exploration for hydrocarbons generally is conducted using a source of seismic energy and receiving and recording the energy generated by the source using seismic detectors. On land, the seismic energy source may be an explosive charge or another energy source having the capacity to impart impacts or mechanical vibrations at or near the earth's surface. Seismic waves generated by these sources travel into the earth subsurface and are reflected back from boundaries and reach the surface of the earth at varying intervals of time depending on the distance traveled and the characteristics of the subsurface material traversed. The return waves are detected by the sensors and representations of the seismic waves as representative electrical signals are recorded for processing.

Normally, signals from sensors located at varying distances from the source are combined together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

Data acquisition for oil exploration may have a negative impact on the environment. The impact of oil exploration methods on the environment may be reduced by using low-impact methods and/or by narrowing the scope of methods requiring an active source, including reflection seismic and electromagnetic surveying methods.

Geophysical and geological methods are used to determine well locations. Expensive exploration investment is often focused in the most promising areas using relatively slow methods, such as reflection seismic data acquisition and processing. The acquired data are used for mapping potential hydrocarbon-bearing areas within a survey area to optimize exploratory well locations and to minimize costly non-productive wells.

The time from mineral discovery to production may be shortened if the total time required to evaluate and explore a survey area can be reduced by applying selected methods alone or in combination with other geophysical methods. Some methods may be used as a standalone decision tool for oil and gas development decisions when no other data is available. Preferable methods will be economical, have a low environmental impact, and relatively efficient with rapid data acquisition and processing.

Geophysical and geological methods are used to maximize production after reservoir discovery as well. Reservoirs are analyzed using time lapse surveys (i.e. repeat applications of geophysical methods over time) to understand reservoir changes during production.

SUMMARY

In one embodiment a method of locating subsurface hydrocarbon reservoirs or displaying hydrocarbon potential maps includes acquiring seismic data having a plurality of components, dividing the seismic data into time windows, applying a data transform to the seismic data having a plurality of components to obtain transformed data components, determining a ratio of the transformed data components and recording the ratio of the transformed data components in a form for display.

In another embodiment a computerized method for determining a subsurface hydrocarbon reservoir location includes determining the subsurface hydrocarbon reservoir location based on ratio data from a plurality of orthogonal spectral components of naturally occurring low frequency background seismic data. The ratio data that exceed a predetermined threshold value, which may be in a predetermined frequency range, indicate the presence of subsurface hydrocarbons.

In another embodiment a computerized method of mapping a subsurface hydrocarbon reservoir includes selecting ratio data which exceed a predetermined threshold value for map locations indicating a subsurface hydrocarbon reservoir. The ratio data are derived from a plurality of orthogonal spectral components of naturally occurring low frequency background seismic data.

In another embodiment an information handling system for determining subsurface hydrocarbons associated with an area of seismic data acquisition includes a processor configured to determine whether a ratio calculated from a plurality of orthogonal spectral components of naturally occurring low frequency background seismic data exceeds a predetermined threshold value, in predetermined frequency range, wherein the ratio exceeding the threshold value indicates a presence of subsurface hydrocarbons. The information handling system also includes a computer readable medium for storing the determined ratio indicating the presence of subsurface hydrocarbons.

In another embodiment a system for subsurface hydrocarbon reservoir mapping includes a machine readable medium storing naturally occurring low frequency background seismic data and map values associated with the seismic data. A processor is configured to determine a plurality of map values associated with the seismic data, each map value determined from a ratio of a vertical spectral component to at least one horizontal spectral component of the seismic data. The processor is configured to determine map values greater than a predetermined threshold that indicate the presence of subsurface hydrocarbons.

In another embodiment a set of application program interfaces is embodied on a machine readable medium for execution by a processor in conjunction with an application program for detecting a subsurface hydrocarbon reservoir. The set of application program interfaces includes a first interface that receives ratio data representative of a vertical spectral component relative to a horizontal spectral component, the spectral components derived from naturally occurring low frequency background seismic data. A second interface receives the ratio data for comparison with a predetermined threshold value to determine whether the ratio data indicates the presence of a subsurface hydrocarbon reservoir.

DETAILED DESCRIPTION

Information to enable the direct detection of hydrocarbon reservoirs or forming hydrocarbon potential maps or displays may be extracted from naturally occurring seismic waves and vibrations measured at the earth's surface. These naturally occurring waves may be measured using passive seismic data acquisition methods to acquire naturally occurring background seismic data. Peaks or troughs in the spectral ratio between the vertical and the horizontal components of the background waves may be used as an indicator for the presence of hydrocarbon reservoirs. While references is made to hydrocarbon reservoir maps, it should be understood that the methods apply equally to methods for hydrocarbon potential maps, that is where data indicated the possibility of hydrocarbons in the subsurface.

Low-impact survey methods like passive seismic data acquisition may be used for reconnaissance in frontier exploration areas, to monitor reservoirs over the productive life of a field or to cost-effectively upgrade data room information to generate higher license bids. Specific applications for passive seismic data include monitoring fluid flow, estimating shear-wave velocities, site zonation and shear-wave amplification studies for earthquake hazard surveys, monitoring hydraulic fracturing during reservoir stimulation and inversion for earth structure.

Passive seismic data acquisition methods rely on seismic energy from sources not directly associated with the data acquisition. In passive seismic monitoring there is no actively controlled and triggered source. Examples of low frequency ambient waves that may be recorded with passive seismic acquisition are microseisms (e.g., rhythmically and persistently recurring low-frequency earth tremors), microtremors and other anthropogenic or localized seismic energy sources.

Microtremors are attributed to the background energy present in the earth that may be due to non-seismic sources or anthropogenic noise. Microtremor seismic waves may include sustained seismic signals within a limited frequency range. Microtremor signals, like all seismic waves, contain information affecting spectral signature characteristics due to the media or environment that the seismic waves traverse. These naturally occurring relatively low frequency background seismic waves (sometimes termed noise or hum) of the earth may be generated from a variety sources, some of which may be indeterminate.

Survey results from passive seismic surveying demonstrate that the spectral characteristics of microtremor seismic waves often contain relevant information for direct hydrocarbon detection. Direct hydrocarbon reservoir indicators may be extracted from naturally occurring low frequency background seismic data using spectral analysis of these microtremors. Spectral ratios or changes in spectral ratios over geographic areas may be used to delineate subsurface hydrocarbon reservoirs. Microtremor analysis provides a method for identification and mapping of fluid reservoirs or reservoir related parameters directly from data acquired near the earth's surface in land and marine areas using naturally occurring seismic background waves. Collected over time these data highlight changes in reservoir parameters.

Microtremor analysis allows for direct determination of a hydrocarbon reservoir independent of the reservoir structure. Additionally, the thickness of strata associated with a hydrocarbon reservoir may be determined or inferred from microtremor analysis.

One or more sensors are used to measure vertical and horizontal components of motion due to background seismic waves at multiple locations within a survey area. These components may be measured separately or in combination and may be recorded as signals representing displacement, velocity, and/or acceleration.

The sensors may measure the components of motion simultaneously or asynchronously. As the spectral ratio of the acquired signal for any location may be quite stable over time, the components of motion may not need to be measured simultaneously. This may be especially applicable in areas with relatively low local ambient wave energy and for data acquired over relatively short time periods (e.g., a few weeks). Spectral ratios determined from asynchronous components at a location may be used as it is the relative difference of spectral components as opposed to specific contemporaneous differences that may be indicative of reservoir characteristics. However, due to anthropogenic or localized seismic energy generated in the vicinity of the seismic survey not related to subsurface reservoirs, relative quiescent periods free of this local anthropogenic seismic energy wherein orthogonal data components are substantially contemporaneously acquired may provide better quality data for delineating subsurface characteristics.

The spectral ratio of vertical to horizontal data components may be calculated to obtain a ratio of at least one horizontal component over the vertical component (a H/V ratio), or the vertical component over at least one horizontal component (a V/H spectral ratio). Characteristics of spectral ratio data may be mapped, for example by plotting geographically and contouring the values. Peaks (or troughs) representative of anomalies within the spectral ratio map may correspond to hydrocarbon or other fluid accumulation within the earth. Changes in V/H ratios over a survey area may be used to detect the boundaries of the reservoirs, and may correspond to areal boundaries of hydrocarbon accumulations. These anomalies may also give an indication of the thickness of fluid reservoirs. This information may be compared, analyzed and integrated with other geophysical and geological knowledge to improve an operator's understanding of the subsurface.

Geophysical survey local conditions may affect a method's results. In many cases the spectral ratio method provides a reliable direct hydrocarbon indicator; in other cases a skilled operator can use the results to improve their interpretation of other geological and geophysical data and generate an improved subsurface model allowing for more efficient exploration and production decisions.

The sensor equipment for measuring seismic waves may be any type of seismometer. Seismometer equipment having a large dynamic range and enhanced sensitivity compared with other transducers may provide the best results (e.g., multi-component earthquake seismometers). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Ambient noise conditions representative of seismic wave energy that may have not traversed subsurface reservoirs can negatively affect the recorded data. Techniques for removing unwanted artifacts and artificial signals from the data, such as cultural and industrial noise, are important for applying this method successfully in areas where there is high ambient noise that has not interacted with a subsurface hydrocarbon reservoir.

The spectral ratio method has several advantages over conventional seismic data acquisition for exploration including that the technique does not require an artificial seismic source, such as an explosion, mechanically generated vibration or electric current. Additionally, the results from spectral analysis are repeatable and the results may be correlated to hydrocarbon accumulations. There is little or no environmental impact due to data acquisition. The method is applicable for land, transition zones and marine areas. The method has application in areas where higher frequencies are greatly affected by geological conditions, e.g. in areas where soft soil layers attenuate high-frequency seismic signals as well as areas where salt formations or volcanic bodies (e.g. basalt flows, volcanic sills) scatter or obscure higher frequencies.

Spectral ratio analysis may take advantage of the selective absorption and hydrocarbon induced relative amplification of relatively low-frequency seismic background waves to enable mapping spectral difference that directly indicate hydrocarbon reservoirs.

The spectral ratio of the horizontal over the vertical components (H/V ratio) of seismic background waves has been used as an indicator for soft soil layers and other near-surface structures. Soft soil resonance effects visible in H/V spectra often occur at frequencies (up to 20 Hz). In contrast to the soft soil effect, in the vicinity of hydrocarbon reservoirs, the horizontal earth movements may be attenuated more strongly than the vertical movements as compared to areas distal from hydrocarbon reservoirs. This relative attenuation may result in a trough in the H/V ratio spectrum or a peak in the V/H ratio spectrum. The hydrocarbon related peak in the V/H spectrum may be located at relatively low frequencies (e.g., between 0 and 10 Hz, and often in the range 1 to 4 Hz), though parameters may be case specific.

Figure 1:
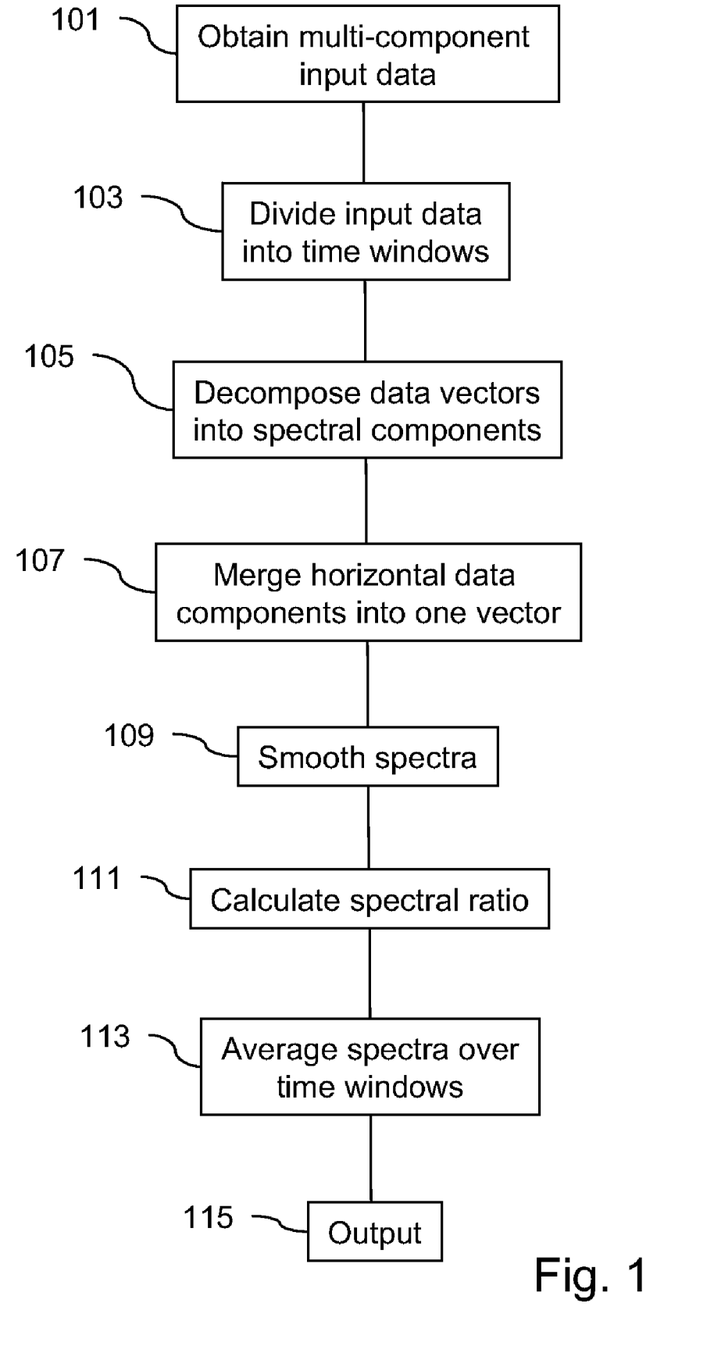
FIG. 1 is a schematic illustration of a method according to an embodiment of the present disclosure for calculating a spectral ratio.

FIG. 1 is a schematic illustration of a method according to an embodiment of the present disclosure using passively acquired naturally occurring background seismic data to determine a spectral ratio related to direct indications of hydrocarbons. The embodiment, which may include one or more of the following referenced components (in any order), is a method of locating subsurface anomalies related to hydrocarbon accumulations that includes obtaining seismic data having a plurality of components 101. The acquired data may be time stamped and include multiple data vectors. An example is multicomponent earthquake type seismometry data, which includes recordings of low-frequency seismic background waves as differentiated from localized or anthropogenic energy related seismicity. The multiple data vectors may each be associated with an orthogonal direction of movement. Data may be acquired in, or mathematically rotated into, orthogonal component vectors arbitrarily designated east, north and depth (respectively, Ve, Vn and Vz) or designated $V_x$, $V_y$, and $V_z$ according to desired convention. The data vectors may all be the same length and synchronized.

The vector data may be divided into time windows 103 for processing. Window lengths may be greater than ten times the period of the lowest frequency of interest. For example if a frequency of interest has a period around 7 seconds all the windows may be at least 70 seconds long. However, the length of time windows for analysis may be chosen to accommodate processing or operational concerns.

A data transform may be applied to each component of the vector data 105. Seismic data frequency content often varies with time. Time-frequency decomposition (spectral decomposition) of a seismic signal enables analysis and characterization of the signal time-dependent frequency response due to subsurface materials and reservoir parameters.

Various data transformations are useful for time-frequency analysis of seismic signals, such as continuous or discrete Fourier or wavelet transforms. Examples include without limitation the classic Fourier transform or one of the many continuous Wavelet transforms (CWT) or discrete wavelet transforms. Examples of other transforms include Haar transforms, Haademard transforms and wavelet transforms. The Morlet wavelet is an example of a wavelet transform that may be applied to seismic data. Wavelet transforms have the attractive property that the corresponding expansion may be differentiable term by term when the seismic trace is smooth. Additionally, signal analysis, filtering, and suppressing unwanted signal artifacts may be carried out efficiently using transforms applied to the acquired data signals.

One or more orthogonal components of the acquired data may be merged, for example the horizontal data components 107. Horizontal components Ve and Vn may be merged by any of several ways including a root-mean-square average so that horizontal component H may be defined as $H=\sqrt{(V_e^2+V_n^2)/2}$. Whether merging data components is undertaken before or after a data transform is applied to the data is a matter of choice.

Additionally the spectra may be smoothed using a moving average 109. The smoothing parameter defines the width of the window (in Hz) used for calculating moving averages. A large smoothing parameter leads to strong smoothing and a small smoothing parameter leads to less smoothing. Typical values may be between 0.1 Hz and 2 Hz, but will be case dependent. A smoothing parameter for a flow may be selected at the beginning of a processing flow for application prior to calculating a spectral ratio.

The V/H spectral ratio is calculated 111 based on the spectral division (e.g., point-by-point spectral division) between the transformed output of at least two orthogonal components, such as a horizontal spectral component and the vertical spectral component. The horizontal component may be a combination of the measured horizontal components (as in 107). These spectra or the calculated spectral ratios may be averaged over time windows 113. Averaging over time windows may be by arithmetic mean or geometric mean. Averaging of spectra may be undertaken before or after dividing the spectra into spectral ratios. The results after this processing may be output 115 in a form for mapping or other display. Maps of this V/H spectral ratio output may provide direct indications of the geographical extent of hydrocarbon reservoirs in the field survey vicinity. Values indicating the presence of a hydrocarbon reservoir may be selecting using a threshold ratio value which may be determined objectively or subjectively. For example, ratio data that exceed (being greater than) a threshold V/H ratio of 1.5 (or that exceed (lower than) an H/V ratio of 0.67) has been shown to indicate a hydrocarbon reservoir. Greater or lower threshold values may be area or survey dependent. An example of ratio data exceeding a predetermined threshold value indicating the presence of subsurface hydrocarbons over a survey area includes a non-random grouping of V/H ratio data greater then 1.0. Alternatively the V/H ratio may be chosen greater than 1.1, 1.2 etc.

Figure 2:
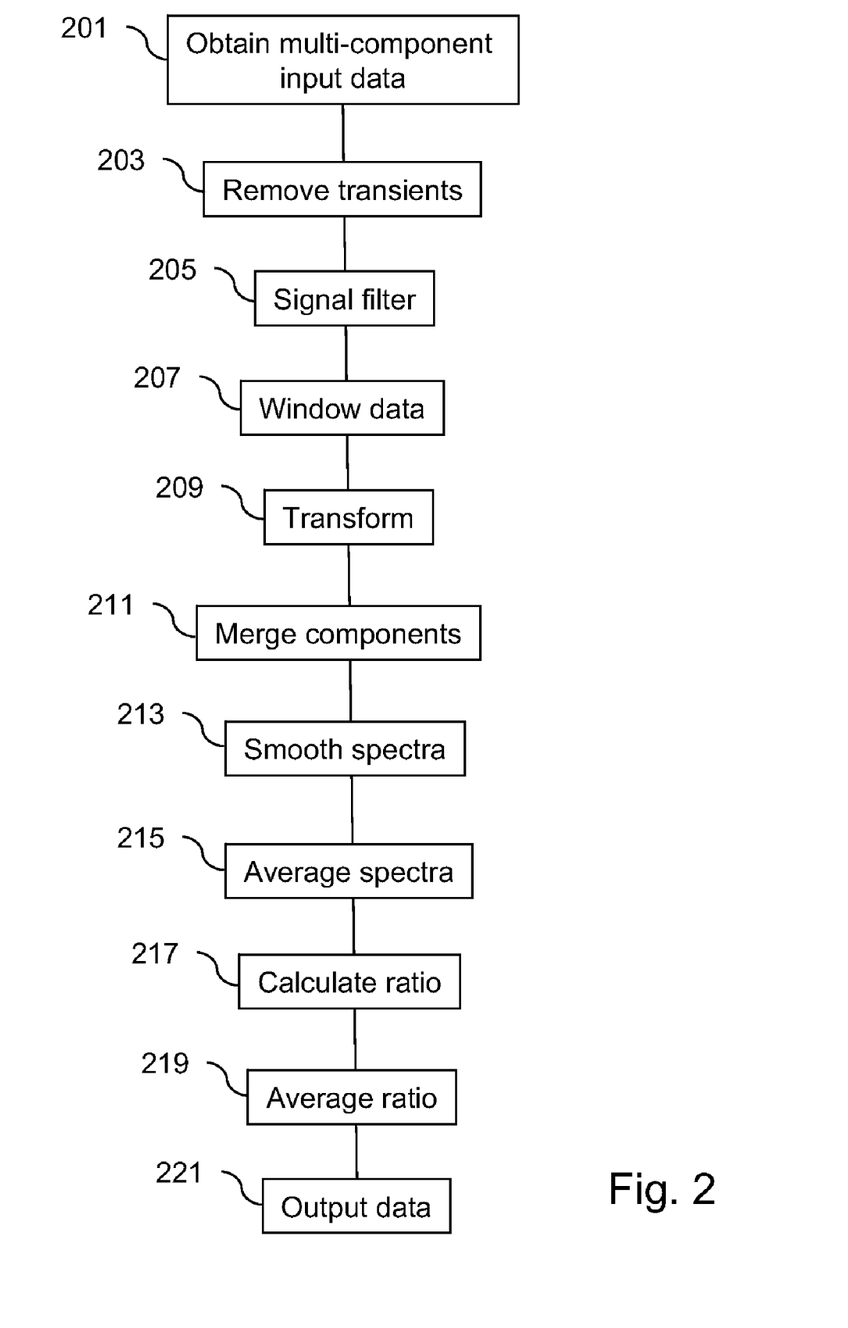
FIG. 2 illustrates a flow chart related to a method for processing according to an embodiment of the present disclosure for determining parameters related to subsurface hydrocarbon reservoir detection.

FIG. 2 illustrates an embodiment, which may include one or more of the referenced components (in any order), for determining hydrocarbon accumulations in a subsurface reservoir. Seismic data that has a plurality of components 201 are obtained. The data may include a time stamp vector and orthogonal data vectors. The data vectors may be all same length and synchronized. The components may be orthogonal vector data representing two horizontal directions and a vertical direction.

The multicomponent input data may be cleaned to remove transients 203. One way to remove transients is to process data when transients are not present. Signal filtering 205 with the time domain data include frequency filtering and bias removal. The data may be detrended so that one or more linear trends are removed. The data may be band pass filtered or a DC offset bias removed as well.

The data may be divided into time windows 207. The time window length for data vectors may be chosen based on operational or processing considerations, and an example length may correspond to 10 cycles of the lower frequency range of interest. Horizontal data components may be merged, for example by averaging or by a root-mean-square weighting of the values.

Data may be rotated to any desired reference frame. A reference frame where the vertical vector direction is normal to the geoid may be beneficial for subsequent formation of V/H spectral ratios. The spectra may be smoothed, for example with a moving average function. The data may be decomposed into spectral components 209 by any time-frequency decomposition, e.g., Fourier or Wavelet transform.

One or more orthogonal components of the obtained data may be merged 211, for example the horizontal data components (e.g., 107). Horizontal components Ve and Vn may be merged by any of several ways including a geometrical means like the root-mean-square average so that horizontal component H may be defined as $H=\sqrt{(V_e^2+V_n^2)/2}$. Other methods for merging including using an arithmetic mean, a Pythagorean mean or a complex Fourier transformation.

The spectra may be smoothed 213 using a low pass filter, a moving window with a fixed bandwidth or a variable bandwidth. The spectra may be averaged 215 using an arithmetic mean or a geometric mean.

A spectral ratio is determined between transformed components 217. The spectral ratio may be determined with point-by-point spectral division, for example determining spectral ratios between horizontal and vertical data. A V/H spectral ratio may be determined using the vertical component with one or both horizontal components, or a merged version of the horizontal components. The spectral ratio may be averaged 219 as well, using an arithmetic or geometric mean. The calculated ratio may be stored 221 (to a computer readable media) in a form for display and/or formed into a map. A map created with the calculated ratio may give a direct indication of the geographical extent of subsurface hydrocarbon reservoirs.

In an alternative embodiment, passively acquired seismic data as input are examined as to whether vector components have the same length, the data are divided into time windows, a Fast Fourier Transform (FFT) or other transform is applied to each component, horizontal components are merged to obtain one horizontal component, the data are be smoothed, a V/H spectral ratio is calculated and the spectra are averaged over discrete time ranges within time windows. Data output may include a frequency stamp vector and one vector with the corresponding V/H spectrum amplitudes. A frequency stamp vector contains the discrete values of frequency where there is a corresponding amplitude value available (e.g. from the Fourier transformation). The amplitude spectrum of a signal may be plotted against the frequency stamp vector to obtain a display of the spectrum as a curve. The frequency vector covers the frequency range of interest (e.g. from 0 to 20 Hz) by equally spaced values. Example: 0,0.1,0.2,0.3, . . . , 19.9, 20 (values in Hz).

While data may be acquired with multi-component earthquake seismometer equipment with large dynamic range and enhanced sensitivity, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise (representative of wave energy not traversing a subsurface hydrocarbon reservoir) and provide extended periods of data with fewer noise problems.

The layout of a survey may be varied, e.g. measurement locations may be close together or spaced widely apart and different locations may be occupied for acquiring measurements consecutively or simultaneously. Simultaneous recording of a plurality of locations may provide for relative consistency in environmental conditions that may be helpful in ameliorating problematic or localized ambient noise not related to subsurface characteristics.

Figure 3:
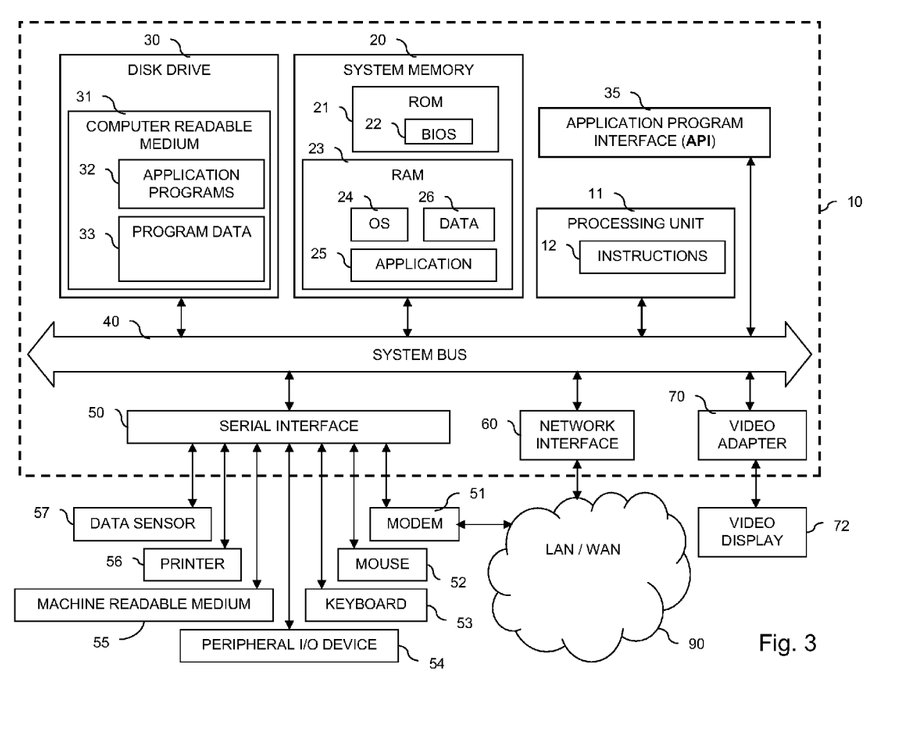
FIG. 3 is diagrammatic representation of a machine in the form of a computer system within which a set of instructions, when executed may cause the machine to perform any one or more of the methods and processes described herein.

FIG. 3 illustrates a schematic example of the hardware and operating environment for which embodiments as described herein and their equivalents may be practiced. The description of FIG. 3 includes a general description of computer hardware, computing environment or information handling system for which the embodiments may be implemented. Although specific hardware may not be required, embodiments may be implemented in the general context of computer-executable instructions, such as program modules, being executed by a computer. Various embodiments may be practiced with a personal computer, a mainframe computer or combinations that include workstations with servers. Program modules include routines, programs, objects, components and data structures for performing tasks, processing data, and recording and displaying information.

The products as defined herein may be particularly adapted for use in what are termed "information handling system." An information handling system is any instrumentality or aggregate of instrumentalities primarily designed to compute, classify, process, transmit, receive, retrieve, originate, switch, store, display, manifest, measure, detect, record, reproduce, handle or utilize any form of information, intelligence or data for business, scientific, control or other purposes. Examples include personal computers and larger processors such as servers, mainframes, etc, and may contain elements illustrated in FIG. 3.

Embodiments may be practiced with various computer or information handling system configurations that separately or in combination may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules operating in distributed computing environments may be located in various memory locations, both local and remote.

FIG. 3 is illustrative of hardware and an operating environment for implementing a general purpose computing device or information handling system in the form of a computer 10. Computer 10 includes a processor or processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 3, there may be a single central-processing unit (CPU) or a graphics processing unit (GPU), or both or a plurality of processing units. Computer 10 may be a standalone computer, a distributed computer, or any other type of computer.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with calculating a ratio of data components, which may be spectral components, for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for one or more application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

The application programs 32 may be associated with one or more application program interfaces. An application programming interface (API) 35 may be an interface that a computer system, library or application provides in order to allow requests for services to be made of it by other computer programs, and/or to allow data to be exchanged between them. An API 35 may also be a formalized set of software calls and routines that can be referenced by an application program 32 in order to access supporting application programs or services, which programs may be accessed over a network 90.

APIs 35 are provided that allow for higher level programming for displaying and mapping subsurface reservoirs. For example, APIs are provided for receiving seismic data, and decomposing, merging, smoothing and averaging the data. Moreover, the APIs allow for receiving the frequency product data and storing it for display.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein are nonlimiting examples of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from spectral ratio values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 3 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

In one embodiment a computerized method for determining a subsurface hydrocarbon reservoir location includes determining the subsurface hydrocarbon reservoir location based on ratio data from a plurality of orthogonal spectral components of naturally occurring low frequency background seismic data. The ratio data that exceed a predetermined threshold value indicate the presence of subsurface hydrocarbons.

The method may include calculating ratio data are from vertical spectral components of the seismic data relative to horizontal spectral components of the seismic data. The ratio data may be calculated with vertical spectral components as a numerator and with horizontal spectral components as a denominator. With vertical spectra to horizontal spectra, the presence of subsurface hydrocarbons may be indicated with ratio values greater than a predetermined threshold value of 1.5 though, of course, the threshold that indicates hydrocarbon presence will be case dependent. For example, in some areas, the predetermined threshold may be selected with a value of 1.0. Conversely, with a horizontal spectral component as a numerator and with a vertical spectral component of as a denominator, the ratio data associated with the presence of subsurface hydrocarbons may be less than a predetermined threshold value of 0.67. The ratio data may be selected for a frequency range between 1 Hz and 5 Hz. The orthogonal spectral components may be determined by applying a data transform to a plurality of orthogonal components of motion for the naturally occurring low frequency background seismic data. The data transform to apply may be a discrete Fourier transform, a continuous Fourier transform, a continuous wavelet transform, or a discrete wavelet transform.

In another embodiment a computerized method of mapping a subsurface hydrocarbon reservoir includes selecting ratio data which exceed a predetermined threshold value for map locations indicating a subsurface hydrocarbon reservoir. The ratio data are derived from a plurality of orthogonal spectral components of naturally occurring low frequency background seismic data.

The method may include determining ratio data representing a vertical spectral component of the seismic data over a horizontal spectral component of the seismic data. A subsurface hydrocarbon reservoir map may be created by contouring the ratio data over a geographical area associated with the seismic data. The orthogonal spectral components may be determined by applying a data transform to a plurality of orthogonal components of motion for the naturally occurring low frequency background seismic data. The data transform may be a discrete Fourier transform, a continuous Fourier transform, a continuous wavelet transform, or a discrete wavelet transform.

In another embodiment an information handling system for determining subsurface hydrocarbons associated with an area of seismic data acquisition includes a processor configured to determine whether a ratio calculated from a plurality of orthogonal spectral components of naturally occurring low frequency background seismic data exceeds a predetermined threshold value wherein the ratio exceeding the threshold value indicates a presence of subsurface hydrocarbons. The information handling system also includes a computer readable medium for storing the determined ratio indicating the presence of subsurface hydrocarbons.

The processor of the information handling system may be configured to apply a data transform to the naturally occurring low frequency background seismic data to obtain a vertical spectral component and to obtain at least one horizontal spectral component. Additionally, horizontal spectral components may be merged into one horizontal spectral component. The predetermined threshold value for the ratio indicative of subsurface hydrocarbons may be equal to or greater than 1.5 or some other value derived from experience locally or from other areas. The ratio may be determined for vertical spectral component frequencies and horizontal spectral component frequencies between 1 Hz and 5 Hz. The information handling system may also include a graphical display coupled to the processor and configured to present a view of the ratio as a function of position. The processor may be configured to generate the view (as a map) by contouring the ratio over an area associated with the seismic data.

In another embodiment a system for subsurface hydrocarbon reservoir mapping includes a machine readable medium storing naturally occurring low frequency background seismic data and map values associated with the seismic data. A processor is configured to determine a plurality of map values associated with the seismic data, each map value determined from a ratio of a vertical spectral component to at least one horizontal spectral component of the seismic data. The processor is configured to determine map values greater than a predetermined threshold that indicate the presence of subsurface hydrocarbons.

The processor for the system may be configured to apply a data transform to naturally occurring low frequency background seismic data to obtain a vertical spectral component and to obtain at least one horizontal spectral component. Additionally, horizontal components may be merged. The processor may also be configured to contour the ratio over a geographical area associated with the seismic data to create values for a map of a subsurface hydrocarbon reservoir. A graphical display coupled to the processor may be configured to present a view of the ratio as a function of position, wherein the processor is configured to generate the view by contouring the ratio data. The processor may also differentiate map values indicating the presence of subsurface hydrocarbons from other map values for the view displayed.

In another embodiment a set of application program interfaces is embodied on a machine readable medium for execution by a processor in conjunction with an application program for detecting a subsurface hydrocarbon reservoir. The set of application program interfaces includes a first interface that receives ratio data representative of a vertical spectral component relative to a horizontal spectral component, the spectral components derived from naturally occurring low frequency background seismic data. A second interface receives the ratio data for comparison with a predetermined threshold value to determine whether the ratio data indicates the presence of a subsurface hydrocarbon reservoir.

A third interface may receive vertical motion component data from naturally occurring low frequency background seismic data for a data transform to obtain a vertical spectral component and a fourth interface may receive horizontal motion component data from the seismic data to obtain a horizontal spectral component. The data transform for the third and fourth interface may be a discrete Fourier transform, a continuous Fourier transform, a continuous wavelet transform, or a discrete wavelet transform. A fifth interface may receive data to merge two horizontal spectral components to obtain a merged horizontal spectral component. A sixth interface may receive the ratio data in a form for display. A seventh interface may receive the ratio data for contouring in a form for display as a map.

In another embodiment a method of mapping a subsurface hydrocarbon reservoir includes determining a ratio data for a plurality of orthogonal spectral components of naturally occurring low frequency background seismic data. The ratio data are displayed as a subsurface hydrocarbon reservoir map.

The ratio data may represent a vertical spectral component of the seismic data over a horizontal spectral component of the seismic data. The subsurface hydrocarbon reservoir map may include contouring the ratio data over a geographical area associated with the seismic data. The orthogonal spectral components may be determined by applying a data transform to a plurality of orthogonal components of motion for the naturally occurring low frequency background seismic data. The data transform may be selected from the group consisting of a discrete Fourier transform, a continuous Fourier transform, a continuous wavelet transform, and a discrete wavelet transform. The two horizontal spectral components may be merged to obtain a horizontal spectral component. Merging the two horizontal spectral components may include determining the square root of the sum of the squares of the two horizontal spectral components. Processing the plurality of orthogonal spectral components may include smoothing the data with a low pass filter, smoothing the data with a fixed bandwidth moving window, smoothing the data with a variable bandwidth moving window, averaging the data with an arithmetic mean, and averaging the data with a geometrical mean.

In another embodiment a set of application program interfaces is embodied on a machine readable medium for execution by a processor in conjunction with an application program for determining a spectral ratio from naturally occurring low frequency background seismic data to map a subsurface hydrocarbon reservoir. The set of application program interfaces includes a first interface that receives seismic data for calculating ratio data of a vertical spectral component to a horizontal spectral component and a second interface that sends the ratio data to a machine readable media to store data associated with subsurface hydrocarbon reservoir maps.

In another embodiment a method of locating subsurface hydrocarbon reservoirs includes acquiring seismic data having a plurality of components, dividing the seismic data into time windows, applying a data transform to the seismic data having a plurality of components to obtain transformed data components, determining a ratio of the transformed data components and recording the ratio of the transformed data components in a form for display or mapping a subsurface hydrocarbon reservoir.

While various embodiments have been shown and described, various modifications and substitutions may be made thereto without departing from the spirit and scope of the disclosure herein. Accordingly, it is to be understood that the present embodiments have been described by way of illustration and not limitation.

We claim:

1. A set of application program interfaces embodied on a machine readable medium for execution by a processor in conjunction with an application program for detecting a subsurface hydrocarbon reservoir, the set of application program interfaces comprising: a first interface that receives ratio data representative of a vertical spectral component relative to a horizontal spectral component, the spectral components derived from naturally occurring low frequency background seismic data; and a second interface that receives the ratio data to compare with a predetermined threshold value, wherein ratio data exceeding the threshold value indicates the location of a subsurface hydrocarbon reservoir.

2. The set of application interface programs according to claim 1 further comprising a fifth interface to receive data to merge two horizontal spectral components to obtain a merged horizontal spectral component.

3. The set of application interface programs according to claim 1 further comprising a sixth interface to receive the ratio data in a form for display.

4. The set of application interface programs according to claim 1 further comprising a seventh interface to receive the ratio data for contouring in a form for display as a map.

5. The set of application interface programs according to claim 1 further comprising: a third interface that receives vertical motion component data from naturally occurring low frequency background seismic data for a data transform to obtain a vertical spectral component; and a fourth interface that receives horizontal motion component data from naturally occurring low frequency background seismic data for the data transform to obtain a horizontal spectral component.

6. The set of application interface programs according to claim 5 wherein the data transform for the third and fourth interface is selected from the group consisting of: a discrete Fourier transform, a continuous Fourier transform, a continuous wavelet transform, and a discrete wavelet transform.

* * * * *